Aug. 18, 1936.   J. A. HYLE ET AL   2,051,214
LOCKING AND RELEASING HAND BRAKE MECHANISM FOR RAILWAY CARS
Filed Feb. 25, 1935

Inventors:
Jacob A. Hyle and
William L. Edwards,
by Jas. L. Skidmore,
Att'y.

Patented Aug. 18, 1936

2,051,214

UNITED STATES PATENT OFFICE 2,051,214

LOCKING AND RELEASING HAND BRAKE MECHANISM FOR RAILWAY CARS

Jacob A. Hyle and William L. Edwards, Chicago, Ill., assignors, by mesne assignments, to Champion Brake Corporation, Wilmington, Del., a corporation of Delaware Application February 25, 1935, Serial No. 8,152

5 Claims. (Cl. 188—81.1)

This invention relates to special improved means for locking and releasing the hand brake shaft employed in connection with hand brake mechanism for railway cars, associated with novel means for quickly taking up the slack and for safely applying the required power in properly applying the brakes, said means forming the subject-matter of a separate application filed under date of October 15, 1934, bearing Serial No. 748,408.

The prime object of the invention is to provide simple, novel, durable, economical, practical, safe and efficient means for locking and releasing the brake applying and releasing means.

Another object of the invention is to so inclose the operating mechanism within a suitable housing fixedly secured to one end of the car that the said mechanism is always fully and properly protected from snow, rain, ice and sleet, thereby preventing undue accumulation of any and all foreign matter that has been known to seriously interfere with the practical operation of the several parts of the mechanism utilized, resulting in costly and serious damage.

Further objects of the invention are to so construct the housing in connection with the shaft bearing surfaces as to furnish more extended, widened and durable surfaces formed of rust resisting metal for the shafts supported within the housing; to provide a vertically disposed operating hand wheel so constructed that the operator cannot accidentally project his arm therethrough to cause accidental damage to his arm; to provide said wheel with downwardly and inwardly extended integral arms terminating at their inner ends with an enlarged cone-shaped hub portion adapted to be snugly fitted to the cone-shaped end portion of the main operating shaft, and to provide a ratchet operating lever arranged to throw to left, facing hand brake wheel, when in applied position and to the right for release, the operating lever under all conditions being within 45° of horizontal when in applied position, movement of the lever being limited insofar as practicable, but when in release position is sufficiently beyond vertical center to insure release when tension is removed from ratchet and positive connection is to be provided between the operating lever and ratchet so that the pawl is forced to release position by hand when necessary, the ratchet release lever and pawl being so constructed and disposed with relation to each other that the pawl will be automatically released from the ratchet wheel when brake wheel is moved in the direction of application sufficiently to release the pawl of the entire load.

The foregoing and such other objects as may appear from the ensuing description are attained by the construction, arrangement, location and combination of the several parts hereinafter more fully described, illustrated in the accompanying drawing and more particularly pointed out in the claims appended hereto, it being understood that slight changes in the precise shape, proportions and minor details of the construction may be resorted to without departing from the spirit or sacrificing any of the advantages of the invention.

In the accompanying drawing forming a part of this specification it will be seen that:

Figure 1:
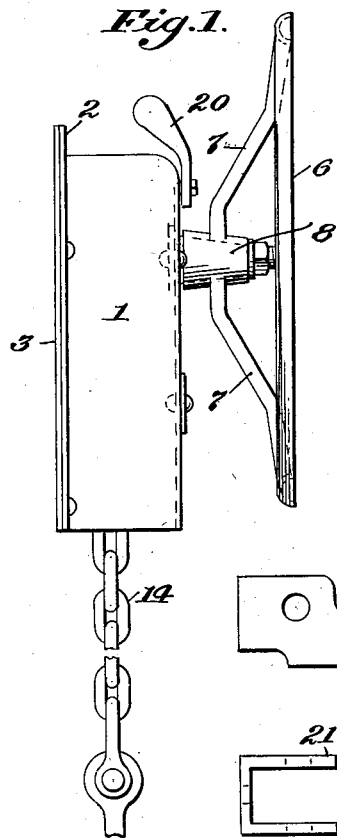
Figure 1 is a side elevation of the means embodying our invention.
Figure 2:
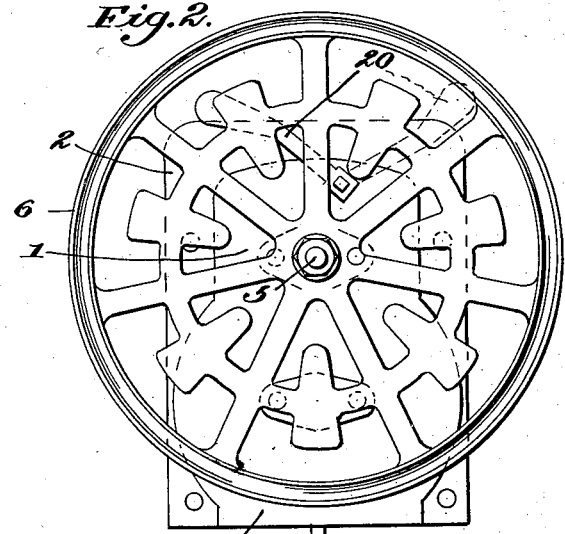
Figure 2 is a front elevation thereof.
Figure 6:
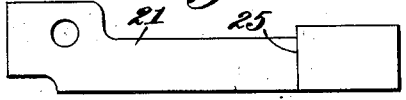
Figure 6 is an enlarged plan of the member shown in Fig. 5.
Figure 7:
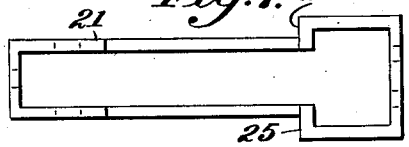
Figure 7 is a plan view of the member shown in Fig. 6.
Figure 3:
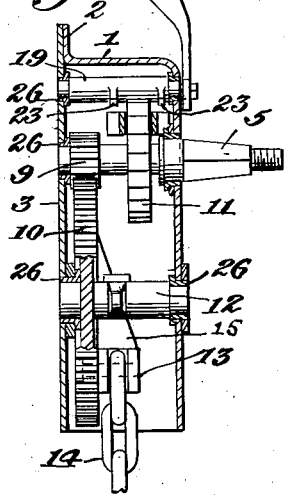
Figure 3 is a central vertical section taken through the housing with the hand operating wheel removed therefrom.

In the embodiment of our invention as illustrated it will be seen that the numeral 1 designates the front pressed steel cover plate of the housing for inclosing and protecting the braking mechanism, said front plate 1 having a lateral extension or rim 2, and 3 is the rear plate thereof, both plates having suitable openings formed therethrough for the reception of rivets for firmly securing said plates together, the rear plate having suitable larger openings therethrough for the reception of fastening bolts for securing the housing to the end of a car.

Suitably supported within the housing is the main operating shaft 5, to the outer end of which is fixedly secured the hand operating wheel 6, said wheel being so constructed as to prevent the operator from accidentally passing his arm therethrough, and is provided with a plurality of downwardly and inwardly extended integral arms 7 terminating with the cone-shaped integral hub portion 8 fitted to the cone-shaped portion of shaft 5 extending beyond the housing, while to the inner end portion of the shaft is fixedly secured a pinion 9 adapted to mesh with the main driving gear wheel 10, and within the housing intermediate the shaft is fixedly secured a ratchet wheel 11.

Disposed within the housing below the main operating shaft 5 is the main chain operating wheel 10 or chain winding drum formed from a single piece of metal with gear teeth around its peripheral portion, said drive wheel comprising a centrally disposed shaft 12. To the outer face of the body portion of the wheel 10 is formed a lateral box-like integral extension 13 having an opening therethrough for the reception of the end link of the brake operating chain 14, and formed integral with a portion of the inner face of the wheel 10 is a member 15 inclined inwardly from the outer face of the extension 13 to the inner face of the peripheral portion of said wheel 10.

Formed integral with and intermediate of the shaft 12 is an outward extension 17 with both its upper and lower faces gradually inclined outwardly and inwardly and terminating with a rounded end portion, and passing through the body portion of the wheel 10 and the extension 13 is a pin for loosely supporting the upper end link of the chain 14, while leading from the said shaft to the peripheral portion of wheel 10 are formed integral wheel bracing and strengthening formations 18.

Disposed above the shaft 4 and supported within the housing at one side of the said shaft is another shaft 19, to the outer end of which is suitably secured a handle member 20 formed in an excess of weight at its upper end portion, and to each side portion of the housing is fixedly secured a casting or yoke-like member 21 formed of a single piece of metal having an opening therethrough for the reception of a loosely pivoted locking pawl 22 disposed between the side walls of member 21, and formed integral with the shaft 19 are two outwardly and downwardly extended formations 23 that always remain below the lateral extension 24 formed on each side of the outer end portion of the pawl 22.

Figure 4:
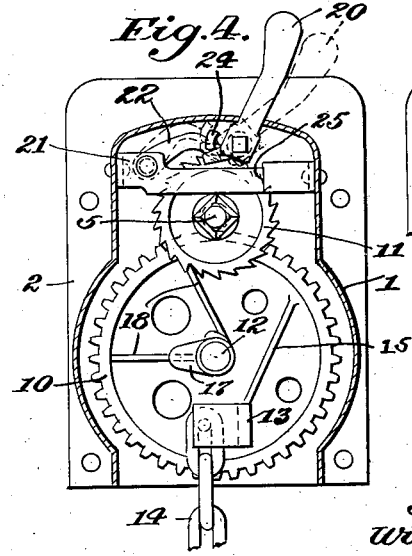
Figure 4 is a front elevation of the means shown in Fig. 3, showing the front plate of the housing broken away.
Figure 5:
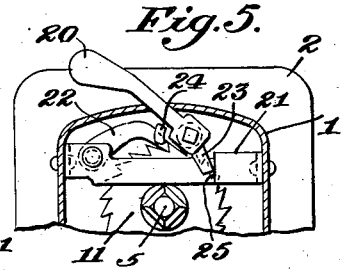
Figure 5 is an elevation partly in section, showing the housing broken away and the normal position of the handle member and pawl when the brake is in released condition.

It will be readily perceived that the upper portion of the ratchet wheel 11 projects upwardly through the member 21 and between the side walls thereof, so that the locking and releasing pawl 22 and the ratchet wheel are always maintained in perfect alinement with each other, while the formations 23 straddle the member 21, and contact with the laterally extended shouldered portions 25 of said member 21, thereby forming a stop to limit the movement of the handle member 20, the said pawl being adapted to automatically ride over the ratchet while applying the brake, and to drop into locking engagement therewith when the brake shall have been properly applied with the pawl 22 resting under considerable forced tension in contact with the teeth of the ratchet wheel, when the handle member 20 is moved from the position shown in Fig. 5 to the position shown by full lines in Fig. 4 with the handle member sufficiently beyond its vertical center, so that when it is desired to release the brake it is simply necessary for the brakeman to forcibly turn the operating wheel slightly to the right, thus relieving said tensional contact of the pawl with the ratchet wheel, when the handle member 20 by gravitational action will automatically assume the position shown by the dotted lines, Fig. 4, and simultaneously lift the pawl 22 away from the ratchet teeth to the position shown by dotted lines in said Fig. 4, the weight of the handle holding the pawl out of contact with the ratchet wheel until the brake shall have been completely released, when the handle may be returned to the position shown in Fig. 5 with the formations 23 resting in contact with the stop shouldered portion 25 of the member 21.

It will be also seen that each end of each of the shafts hereinbefore referred to is provided with a bronze metal sleeve bushing 26 adapted to surround the shaft, and passed through the housing forming extended and durable bearing surfaces for the shafts, and surrounding the said bushing at one end of the shaft 12 is a metal plate riveted to the housing cover plate at the outside of the plate, and at one end of the shaft 5 is a similar metal plate riveted to the inner side of cover plate 1, and at the other end of each of the shafts 5 and 12 is another similar plate suitably secured within the housing around the bushing.

It will be understood that the several parts of the mechanism utilized in connection with our invention may be formed of any suitable dimensions, and of any desirable material possessing the maximum strength and durability required for best serving the practical purposes for which they are intended.

By reference to the drawing it will be readily obvious that an improved hand brake operating and locking and releasing mechanism is composed of a minimum number of parts, since the main driving gear wheel or chain winding drum and its component parts are formed of a single piece of suitable metal; the main driving shaft, pinion and ratchet wheel are formed from another single piece of metal; the yoke-like member 21 is formed from a single piece of metal, while the shaft carrying the pawl operating extensions is formed of a single piece, having an operating handle attached to its outer end.

Having thus described our invention, what we claim and desire to secure by Letters Patent is:

1. Hand brake locking and releasing mechanism for railway cars of the character described, comprising a housing for enclosing and supporting said mechanism, a main brake operating shaft having a pinion and rachet wheel formed integral with the shaft, an integral casting disposed within the housing cover crosswise thereof and riveted at each end to said cover, a pawl loosely pivoted within the casting having a lateral extension formed on each side near its outer end portion, and a shaft having a handle member at its outer end, said last named shaft being provided with integral extensions adapted to straddle the casting and contact with the lower face of the said lateral extensions for releasing the pawl.

2. Hand brake locking and releasing mechanism for railway cars of the character described, comprising a housing for enclosing and supporting said mechanism, a main brake operating shaft with a pinion and ratchet wheel formed integral therewith, a single piece casting fixedly secured to the housing cover at each end thereof crosswise of said cover, a pawl loosely pivoted at its inner end within the casting having a lateral extension formed on each side near its outer end portion, and a shaft having a handle member fixedly secured to its outer end, said shaft being provided with outward integral extensions adapted to straddle the casting and contact with the lower face of the lateral extensions for releasing the pawl.

3. Hand brake locking and releasing mechanism for railway cars of the character described, comprising a housing for protecting and supporting said mechanism, a main brake operating shaft having an integral pinion and ratchet wheel and a vertically disposed hand operating wheel fixedly secured to the outer end of the shaft, an integral casting fixedly secured to the inner face of the housing cover at each end of the casting, a pawl pivotally secured within the casting at the inner end thereof having a lateral extension formed on each side at its outer end portion, and a shaft having a handle fixedly secured to its outer end, said shaft having integral extensions adapted to straddle the casting and contact with the lower face of the said lateral extensions for releasing the pawl.

4. Hand brake locking and releasing mechanism for railway cars of the character described, comprising a housing for protecting and supporting said mechanism, a main brake operating shaft having an integral pinion and ratchet wheel and a vertically disposed hand operating wheel fixedly secured to the outer end of the shaft, a single piece casting disposed crosswise of the housing cover fixedly secured at each end to the inner face of the cover and having a laterally extended shouldered portion at one end forming a stop, a pawl loosely pivoted within the casting provided with a lateral extension formed on each side near its outer end portion, and a shaft having a handle fixedly secured to its outer end portion, said shaft having a plurality of integral extensions adapted to straddle the casting and engage the lower face of said lateral extensions for releasing the pawl.

5. Hand brake locking and releasing mechanism for railway cars of the character described, comprising a housing for enclosing and supporting said mechanism, a main brake operating shaft provided with an integral pinion and ratchet wheel and a vertically disposed hand operating wheel secured to the outer end of the shaft, a single piece casting disposed crosswise of the housing cover fixedly secured at each end to the inner face of the cover, a pawl loosely pivoted within the casting at one end and having a lateral extension formed on each side at its outer end portion, and a shaft having a handle member secured to its outer end, said shaft being disposed above and at one side of the main shaft and provided with integral extensions adapted to straddle the casting and contact with the lower face of the said lateral extensions for automatically releasing the pawl by the movement of the handle member to the right when the load on the pawl has been removed by the hand operating wheel.

JACOB A. HYLE.
WILLIAM L. EDWARDS.